(12) United States Patent
Malavasi et al.

(10) Patent No.: US 8,974,225 B2
(45) Date of Patent: Mar. 10, 2015

(54) COMBUSTION PROCESS

(75) Inventors: Massimo Malavasi, Milan (IT); Grazia Di Salvia, Bari (IT); Edoardo Rossetti, Bologna (IT)

(73) Assignee: ITEA S.p.A., Bologna (IT)

( * ) Notice: Subject to any disclaimer, the term of this patent is extended or adjusted under 35 U.S.C. 154(b) by 1178 days.

(21) Appl. No.: 12/744,613

(22) PCT Filed: Nov. 27, 2008

(86) PCT No.: PCT/EP2008/010095
§ 371 (c)(1),
(2), (4) Date: May 25, 2010

(87) PCT Pub. No.: WO2009/071238
PCT Pub. Date: Jun. 11, 2009

(65) Prior Publication Data
US 2010/0248168 A1 Sep. 30, 2010

(30) Foreign Application Priority Data
Dec. 6, 2007 (IT) .............................. MI2007A2292

(51) Int. Cl.
| | |
|---|---|
| F23J 7/00 | (2006.01) |
| F23J 15/08 | (2006.01) |
| C10L 10/04 | (2006.01) |
| C10L 10/06 | (2006.01) |
| F23L 7/00 | (2006.01) |
| C10L 1/12 | (2006.01) |
| C10L 1/24 | (2006.01) |
| C10L 10/02 | (2006.01) |
| C10L 1/10 | (2006.01) |
| C10L 10/00 | (2006.01) |
| F23C 9/00 | (2006.01) |
| F23G 5/02 | (2006.01) |
| C10L 1/198 | (2006.01) |

(52) U.S. Cl.
CPC . *C10L 10/02* (2013.01); *C10L 1/10* (2013.01); *C10L 10/00* (2013.01); *C10L 10/04* (2013.01); *F23C 9/00* (2013.01); *F23G 5/02* (2013.01); *F23J 7/00* (2013.01); *F23L 7/007* (2013.01); *C10L 1/1208* (2013.01); *C10L 1/1233* (2013.01); *C10L 1/125* (2013.01); *C10L 1/1275* (2013.01); *C10L 1/1283* (2013.01); *C10L 1/1291* (2013.01); *C10L 1/1985* (2013.01); *C10L 1/2437* (2013.01); *F23C 2202/30* (2013.01); *F23G 2201/701* (2013.01); *F23G 2202/106* (2013.01); *Y02E 20/322* (2013.01); *Y02E 20/344* (2013.01)
USPC ......... 431/4; 431/3; 431/2; 110/342; 110/345

(58) Field of Classification Search
USPC .......... 110/342, 343, 345; 60/39.461, 39.464; 431/2, 3, 4
See application file for complete search history.

(56) References Cited

U.S. PATENT DOCUMENTS

| | | | | |
|---|---|---|---|---|
| 3,692,503 | A | | 9/1972 | Kukin |
| 3,807,090 | A | * | 4/1974 | Moss .............................. 48/128 |
| 4,033,113 | A | * | 7/1977 | Cramer .......................... 60/772 |
| 4,388,877 | A | * | 6/1983 | Molayem et al. ............... 44/604 |
| 4,512,774 | A | * | 4/1985 | Myers et al. .................... 44/301 |
| 4,517,165 | A | * | 5/1985 | Moriarty .................. 423/244.05 |
| 4,714,032 | A | * | 12/1987 | Dickinson ..................... 110/347 |
| 4,771,712 | A | * | 9/1988 | Engstrom et al. ............. 110/347 |
| 5,236,354 | A | * | 8/1993 | Goldbach et al. ............... 60/781 |
| 5,261,225 | A | * | 11/1993 | Dickinson .................... 60/39.55 |
| 2003/0079665 | A1 | * | 5/2003 | Atreya .......................... 110/345 |
| 2006/0059768 | A1 | | 3/2006 | Wallenbeck |

* cited by examiner

*Primary Examiner* — John K Fristoe, Jr.
*Assistant Examiner* — Seth W Mackay-Smith
(74) *Attorney, Agent, or Firm* — Arent Fox LLP

(57) ABSTRACT

A combustion process wherein a comburent, a fuel and the following components are fed: i) component B) sulphur or compounds containing sulphur in an amount to have a molar ration $B^1/C^1 \geq 0.5$, wherein $B^1$ is the sum by moles between the total amount of sulphur present in component B)+the total amount of sulphur (component $B^{11}$)) contained in the fuel, $C^1$ is the sum by moles between the total amount of alkaline and/or alkaline-earth metals contained in the fuel (component $C^{11}$))+the amount (component C)) of alkaline and/or alkaline-earth metals in the form of salts and/or oxides contained in component B), ii) component A), comprising low-melting salts and/or oxides or their mixtures, having a melting temperature<1,450 K, wherein the ratio by weight $A'/(A''-A') \geq 1$: 100, wherein A' is the sum by moles between the metals under the form of low-melting salts and/or oxides or their low melting mixtures in the component A) and the amount of metals of low-melting salts and/or oxides contained in the fuel, A" is the sum of the amount of all the metals contained in the fuel and those contained in component A), in which the combustor is isothermal and flameless.

16 Claims, No Drawings

COMBUSTION PROCESS

CROSS-REFERENCE TO RELATED APPLICATION

This application is a National Stage entry of International Application No. PCT/EP2008/010095, filed Nov. 27, 2008, which claims priority of MI2007A002292, filed Dec. 6, 2007. The disclosure of the prior application is hereby incorporated in its entirety by reference.

The present invention relates to a combustion process substantially reducing thin powders in fumes coming out from a combustor, thus with a substantially reduced impact on the environment an on human and animal beings, wherein both conventional fuels and low ranking fuels, as biomasses or waste are used. The combustion process contemporaneously allows to transform the basic ashes (alkaline ashes) contained in fuels, especially in the low ranking ones, into compounds which are not aggressive at the combustion temperatures towards the combustion materials of combustors and of heat recovery plants downstream the combustor.

More specifically, the process of the invention shows a low impact on both the environment and on health of human and animal beings and allows to use also low ranking fuels, as biomasses and waste, also in plants having a high thermal recovery yield and a high transformation yield of thermal energy into electric energy, built with conventional materials (non high alloyed).

The emissions of powders from combustion plants are subjected to regulations. Up to date in Europe the most stringent one is the CE 2000/76 regulation, although the powders have been characterized in an undifferentiated way (total weight). This rule fixes the limits for powders having particle sizes lower than 10 μm, or PM 10, and for the concentration of heavy metals. Further the concentrations of heavy metals, obtained by isokinetic sampling of the flue gas are referred to the dry gas (dehumidified) volume. In the regulation the concentrations relate to the dry flue gas for the combustion with air and are univocally linked to the mass balance criterion for the emissions, by fixing the oxygen concentration in flue gas at 11% by volume. The regulation specifies furthermore that, in the case of combustion with comburent different from air, for example enriched air or oxygen, correction coefficients are applied according to the mass balance criterion. For example, in case of combustion with oxygen with total conversion of oxygen, the correction coefficient (normalization factor) varies with the fuel type and can be as low as 0.085. The mass balance criterion is widely accepted. For example the BAT classification (Best Available Technology) for emissions uses the mass balance.

At present, for flue gas having the combustor no rule exists for classifying the dangerousness of powders on the basis of their particle size, and therefore there are no reference limits for the particle size. This is likely to happen in the near future, by fixing some limits to the powder content having a particle size diameter lower than 2.5 μm, (PM 2.5). On this purpose it is sufficient to see the more and more restricted regulations of the powders into the air, for example in the cities of the world. For example a new proposal of European Directive is under discussion to overcome the 96-62-CE rule which only limits the PM 10 amount to no more than 40 μg/Nm$^3$. The new Directive should introduce a new limit for the PM 2.5 to 20 μg/Nm$^3$ in the air. Furthermore it has to be taken into account that the PM 2.5 limit according to EPA (National Air Quality Standard) is of 15 μg/Nm$^3$ and that the value suggested by OMS (World Health Organization) is even lower, i.e. 10 μg/Nm$^3$. Due to this, the value of PM 2.5 for the powder will be considered in the technology.

It is known in the prior art that that thin powders are contained in flue gas of all industrially used processes. Thin powders are formed of solid particulate having particle diameter lower than 2.5 micrometers (PM 2.5) down to sizes of the order of some nanometers. They are formed of aggregates of organic molecules, for instance carbonaceous crackings with variable hydrogen and oxygen contents (known as soot or diesel particle), and of aggregates of inorganic molecules, for instance salts and/or oxides of alkaline and alkaline-earth metals and heavy metals deriving from the incombustible ashes contained in the fed fuel.

The thin powders of organic origin are classified, depending on the shape, into cenospheres and plerospheres.

As well known, the thin powders are always present in any combustion developing a flame front. In fact, the flame emission in the visible field, as detected by an instrument or by the naked eye, is due to the presence of solids in the flame, since only a solid can emit radiations in the visible field, up to the maximum temperatures of the flames (3,000 K).

It is also known that thin powders cannot be eliminated by the known industrial post-treatment processes of flue gas, as filtration on sleeve filters (impact filtration), electrofilters (migration in an electrostatic field) or scrubbers using aqueous solutions having different pHs or organic solutions. The known processes are effective in removing the relatively coarse particulate (having an average particle diameter greater than 2.5 micrometers), but are completely ineffective in removing the fine particulate, in particular the fraction having particle size lower than 2.5 micrometer, more particularly particle size lower than one micrometer. The latter particle size represents the most dangerous particulate fraction for human and animal health. In fact these particles remain in pulmonary alveoli causing severe diseases.

The incombustible ashes, both the heavy (non volatile) ones and fly ash in particular, have represented a technological problem in combustion plants for long time. In fact they determined the historical/economic classification of fossil fuels, from natural gas to oil, to coal.

In the prior art combustors operating with a high temperature flame front for melting incombustible ashes (slag-combustors) and for reducing the fly-ashes in fumes are also known. In this way the negative impact of the powders carried by hot flue gas on the efficiency of the energy recovery plants is decreased. The drawback of these combustors is that the fly-ash are not removed, since ash melting is never quantitative, at most 70-80% of the fly-ash contained in fuels are removed.

For overcoming this, fuels having a low ash content are used. However these fuels are not available in high amounts. Fuel purification processes, as well known, are very expensive.

In nature fuels containing ashes also in remarkable amounts are very abundant. Besides, the exorbitant increase of the world fuel consumptions and the raising demand for controlling their impact on the environment and on human health, require to have available combustion processes wherein conventional fuels can be used, even those containing ashes also in very high amounts and contemporaneously with reduced emissions of thin powders in fumes from combustors.

As regards the corrosive action of basic ashes on combustors and on the equipments downstream of the combustors it is observed as follows.

The basic ashes are generally formed of alkaline and/or alkaline earth metal oxides and/or salts thereof and are included in the incombustible ash class (ISO 1171). The basic part of said ashes, also known as basic ashes, and in particular those deriving from sodium and potassium compounds, that is found in the ashes of fossil fuels, biomasses and waste, causes in the flame front combustion the formation of oxides and salts, sometimes partially melted, and particularly aggressive at high combustion temperatures towards the materials of the walls of the combustors and of the thermal recovery plants. Said walls are coated with refractories, generally made of aluminum compounds and/or silico-aluminum compounds, optionally containing chromium and zirconium or other metallic materials, as for example steels, alloys. Steel and alloys are in particular used in thermal recovery plants. As said, the basic ashes are capable to corrode the refractory materials by melting them. In order to increase the refractory resistance to said corrosive agents, in the prior art it has been suggested to use for refractories 99.8% tabular $Al_2O_3$ so to reduce the silica content to very low values, or to add zirconium oxides in the refractory composition. However also these modified refractories do not allow to solve the problem of the corrosion of the combustor walls due to basic, ashes.

It is also known in the prior art to use for the manufacture of the walls of thermal recovery plants of chromium-alloyed steels, chromium and nickel-alloyed steels, for example AISI 304H, up to high-alloyed nickel-chromium as Inconel®. The latter is more resistant to the corrosion of basic ashes. However the use of Inconel material has the drawback that the building costs of the plant notably increase.

It is to be observed furthermore that some of the compounds forming the basic ashes develop vapours at the combustion temperature and then, when the fumes cool, said vapours solidify. This causes the corrosion of the walls of the thermal recovery plants. Besides this, agglomerates/deposits are formed in the pipes and in the plants, that in the time can clog said equipments. For example, when the basic ashes contain sodium or potassium in the form of chloride salts, they melt at a relatively low temperature (<1,100° K.) attacking the combustor walls, they evaporate due to their significant partial pressures at a relatively low temperature (<1,300 K) and recrystallize on the surfaces located downstream of the combustors. On this ground the equipments are irremediably damaged. This represents a notable drawback from an industrial point of view.

It is well known in the prior art that fuels can contain high amounts of basic ashes, for example low ranking coals, heavy fractions and pitches of oil origin, bitumens. However, in general, all the fuels contain in a variable amount basic ashes.

In order to reduce the corrosive action of basic ashes, it has been suggested in the prior art to use in combustors low combustion temperatures, generally between 650° C. and 800° C. The advantage is the reduction of basic ashes in the fumes. This allows to overcome the above described drawbacks. However under these conditions toxic uncombusted compounds, as dioxins, furans, polyaromatics, etc., are produced in high amounts in the combustor.

In order to reduce the inconveniences due to the basic ashes in the combustors, in the industry it has been suggested to gasify at low temperatures the solid fuels, bituminous and/or carbonaceous shales. However these processes have the drawback to require an additional plant for the gasification. In any case the basic ashes are present in the synthesis gases obtained in gasifiers. Therefore the problem is not solved but shifted to the downstream plants. It is also known that it is possible to purify the synthesis gases by hot gas cleaning processes. This however requires specific units which are costly and that besides have a very reduced service life. When gas cleaning treatments are carried out at temperatures lower than those employed in plants using synthesis gases, there is the drawback that the thermal efficiency is reduced.

In the prior art it has furthermore been suggested to remove from solid or liquid fuels prior to the combustion the precursors of the basic ashes. This is not achievable from an industrial point of view because of the remarkable number of compounds present in fuels. Even assuming that this removal is possible, very expensive and multi-step cleaning processes would be however required. Thus it has become usual practice to feed the thermal power plants by using fossil fuels having a low content of alkaline and/or alkaline-earth metals, thus to use very valuable and expensive coals. However these fuels are available in not high amounts.

The need was felt to have available an industrial process for reducing and/or substantially removing the corrosive action of basic ashes on the combustor walls and on the surfaces of the thermal recovery plants downstream of the combustors, and contemporaneously reducing the impact on the environment and on the human health of the thin powders (PM 2.5) emitted by combustor, whatever was the fuel used.

It has been unexpectedly and surprisingly found by the Applicant a process solving the above mentioned technical problem.

It is an object of the present invention a combustion process wherein to a combustor a comburent, a fuel and the following components are fed:

i) component B): sulphur or compounds containing sulphur in an amount to have a molar ratio $B^I/C^I \geq 0.5$, wherein
   $B^I$ is the sum by moles between the amount of sulphur present in component B)+the amount of sulphur (component $B^{II}$)) contained in the fuel,
   $C^I$ is the sum by moles between the amount of alkaline and/or alkaline-earth metals contained in the feeding fuel (component $C^{II}$))+the amount (component C)) of alkaline and/or alkaline-earth metals contained in component B), ii) component A) comprising low-melting salts and/or oxides or their mixtures, having a melting temperature $\leq 1,450$ K, wherein the ratio by moles $A'/(A''-A') \geq 0.01$, being
   A' the sum by moles between the amount of metals under the form of low-melting salts and/or oxides or mixtures thereof of component A) and the amount of metals under the form of the low-melting salts and/or oxides contained in the fuel,
   A" is the sum by moles of the amount of all the metals contained in the fuel and of those contained in component A), in which the combustor is isothermal and flameless.

Preferably the combustor temperature is comprised between 1,500 K (1,223° C.) and up to 2,100 K (1,827° C.).

In the process according to the present invention, preferably the combustor pressure is preferably higher than or equal to 101.3 kPa and up to about 2,000 kPa.

The comburent of the invention process is preferably oxygen. For example high purity oxygen (98.5% by volume) can be used. Generally oxygen having titre 88-92% VSA (vacuum swing absorption) and 88-92% VPSA (vacuum pressure swing absorption) can also be used. Preferably the lowest limit of the oxygen titre is 70% by volume, the complement to 100 being formed of inert gases and/or nitrogen. The comburent in the process of the invention is preferably used in molar excess with respect to the stoichiometric amount required for the reaction with the fuel. However it can also be used in defect with respect to the stoichiometric amount.

In the process of the invention the residence time of the fuel in the combustor ranges from 0.5 seconds up to 30 minutes or more, preferably from 2 to 10 seconds. Higher residence times can also be used without however obtaining a substantial variation of the results.

Preferably the combustion gases at the combustor outlet are cooled at a temperature equal to or lower than 1,100 K and in any case lower than the solidification temperature of the condensed vapours of melted ashes. This is an advantage since thermal recovery plants can be used built with conventional materials.

As fuels, biomasses, for example deriving from sugars, animal meals, carbon, industrial scraps from neutralization reactions, high-boiling refinery fractions, bitumens and oil shales, processing scraps of tar sands, peats, exhausted solvents, pitches, in general industrial process scraps and wastes, including the residual fractions from urban scraps, optionally comprising CDR (fuel from scraps). Liquid water-pitch emulsions of oil origin can also be used. All these fuels, as already said, contain basic ashes, in general under the form of oxides and/or salts.

As said, the combustor used in the process of the present invention is isothermal and flameless, since it is operated at temperatures preferably higher than 1,700 K and at a pressure preferably higher than 200 kPa, still more preferably higher than 600 kPa up to 2,026 kPa.

The isothermal combustor used in the invention process is described in the patent application WO 2004/094,904 in the name of the Applicant, herein incorporated by reference.

When the fuel is introduced into the isothermal combustor in admixture with water and/or steam, the combustor operates as described in patent application WO 2005/108,867.

Preferably the fed comburent is premixed with recycling fumes, the fume amounts is generally higher than 10% by volume, preferably higher than 50% by volume. The recycling fumes preferably contain also water in the vapour form, generally in amounts calculated on the total volume of the recycling fumes, higher than 10% by volume, preferably higher than 20% by volume, still more preferably higher than 30% by volume.

The fed comburent can also be in admixture with steam, which can partially or totally substitute the recycling fumes.

The feeding fuel can contain also water/steam in an amount depending on the type of fuel used. The percentage of water in the fuel, expressed as percent by weight, can also be up to 80% and even higher, with the proviso that the value of the lower heating power (LHV) >6500 kJoule/Kg of fed mixture.

The gases at the outlet of the combustor are cooled by mixing them in a mixer with recycling gases, up to reaching a final temperature lower than 1,100 K. The fumes can be conveyed to a heat exchanger wherein water is fed to produce steam. The fumes which have been submitted to the heat transfer step are partly compressed again for recycling to both the combustor and to the mixer, at the combustor outlet. A part of said fumes is laminated at atmospheric pressure for operating fume post-treatment. Preferably the fume portion corresponding to the net fume production of the combustion is expanded up to atmospheric pressure for obtaining mechanical work and then sent to a fume post-treatment unit. The fumes to be expanded are taken in correspondence of the mixer outlet.

The expansion can be achieved by using a turboexpander, since the fumes are substantially fly-ash free.

In the lower part of the combustor a collection vessel for the melted ashes is provided. The collected ashes are then cooled, for example in a water bath, and transferred in a solid vitrified state into static settlers.

For the Component i) it is Observed the Following

In the fuel sulphur component $B^{II}$) can be present under the form of elementary sulphur or of organic and inorganic compounds containing sulphur.

In the fuel the alkaline and/or alkaline-earth metals component $C^{II}$ are generally present in the form of salts, mixed salts, oxides or mixed oxides.

Preferably the molar ratio $B^I/C^I$ is at least 0.7, more preferably at least 1, still more preferably at least 2.

When in fuel basic ashes the metals present are monovalent metals only, the $B^I/C^I$ ratio is preferably higher than 0.5, when the metals present are bivalent metals only, the $B^I/A^I$ ratio is at least 1.

An upper limit can be any value, for example molar ratios of 10 or 100 can also be used. It is to be noticed, however, that it is preferable not to use high amounts of sulphur since in said cases plants for removing the sulphur in excess are required downstream of the combustor.

The addition of component B) to the combustor can be carried out by feeding the component B) separately from the fuel, preferably in admixture therewith.

When component B) is elementary sulphur, it can be fed as a surfactant containing aqueous dispersion. Suitable surfactants are arylalkyl- or alkylarylsulphonates, polyethoxylates, etc.

Preferably the amount of component B) used is such that in the combustion fumes the partial pressure of $SO_2$ that is formed is higher than 0.0004 bar (40 Pa) and preferably up to 0.003 bar (300 Pa). Component B), as for example sulphur, is dosed as $SO_2$ in the combustion fumes. The process control is preferably carried out by using codes (control software) requiring a characteristic response time of about 10 seconds. To this purpose the fumes at the outlet of the combustor are monitored by a multiple gas analyzer, NDIR type (Non Dispersive InfraRed)/NDUV (Non Dispersive Ultra Visible), modified to give a response time T95 of 1.5 seconds.

As component B) instead of sulphur, sulphur containing organic and inorganic compounds can be used. For example sulphites, bisulphites, hydrogen sulphide, sulphates, mercaptans, etc. can be used.

Furthermore it has been unexpectedly and surprisingly found by the Applicant that, even when using very high $B^I/A^I$ ratios, therefore very high sulphur amounts, no corrosion of the combustor walls and of the thermal recovery plants walls downstream of the combustor is observed.

The Applicant has surprisingly and unexpectedly found that, by operating under the above mentioned conditions, the fumes coming out from the combustor are substantially aggressive basic ash-free, that are non aggressive compounds for the construction materials. It has been found that the walls of both the combustor and of the thermal recovery plants substantially remain unaffected. They are neither attacked by the basic ashes nor by the combination of the basic ashes with other components present in the fuels, as for example vanadium. In fact it has been surprisingly and unexpectedly found that the basic ashes are transformed by the process of the invention into inert compounds, mainly sulphates, which neither attack the refractories of the combustor walls nor the metallic materials, in particular steels and metal alloys which, as said, form the walls of the plants downstream of the combustor. The Applicant has surprisingly and unexpectedly found that it is possible to use in the plants downstream of the combustor, as for example in those parts of the thermal recovery plants operating at higher temperature, metal alloys as for example AISI 304H steel wherein in the prior art high alloyed steels such as Inconel pr Hastelloy have been used. This is advantageous since it allows to save costs.

Metal determination in fuel is carried out on the fuel ashes by plasma techniques, for example ICP-OES. The fuel ashes are obtained for example according to the ISO 1171 test or as residue after pyrolysis at a temperature of 600° C.

As Component ii) the Following is Observed

For determining the low-melting fraction the fuel ashes are brought to melting up to the temperature of 1,450 K and on the recovered melted part metals are determined.

Various methods can be used for determining the ash melting temperature, for example the ASTM D 1857-87 test. The low-melting fraction of the fuel ashes is isolated by using, for example, a melting pot, with a 5 mm diameter, by heating at 1,450 for at least 2 hours.

As said, the ratio by moles A'/(A''−A') is at least 0.01, preferably at least 0.1, still more preferably 0.2. The upper limit can be very high. For example it can be up to 1,000,000, generally up to 100. It can also reach the infinite value when (A''−A')=0. This happens when the compounds of metals present in the fuel are all low-melting compounds, i.e. they melt at a temperature lower than 1,450 K. In other words, metals giving compounds or mixtures melting at a temperature higher than that indicated above, are absent in this case.

In the process of the present invention there may be the case wherein (A''−A')≠0 or the case wherein (A''−A')=0. It has been surprisingly and unexpectedly found by the Applicant that also in the latter case, (A''−A')=0, the thin powders (PM 2.5) in the fumes at the outlet of the combustor are drastically reduced. It has been found that in the plants downstream of the combustor no significant deposits of solidified ashes are formed.

As component A), a mixture with melting temperature ≤1450 K of one or more compounds A) with high-melting salts and/or high-melting oxides, having a melting temperature above 1450 K, can also be used. The one or more compounds A) are used in amounts preferably higher than 5% by weight, more preferably up to 30% by weight. An example of high melting compound is bentonite.

Therefore, eutectic compositions or like-eutectic compositions, provided that they have a melting point lower than 1,450 K, can be used in the present invention.

As low-melting salts and/or oxides of component A), sodium and/or potassium oxides and/or salts, for example sulphates, phosphates and chlorides; alumino silicates of alkaline and alkaline earth metals, etc., can be used. Low-melting mixtures as described above can be easily obtained from the skilled in the field. See for example "CRC Handbook of Chemistry and Physics", 1996-1887 Ed., or "The American Ceramics Society, www.ceramics.org/phase".

Other optional components, clays, silica aluminas, etc. can be added into the combustor.

The addition of component A) to the combustor can be carried out by feeding it separately from the fuel, preferably in admixture with it.

When component A) is fed separately from the fuel, it can be for example in the form of an aqueous solution or suspension.

It is also possible to feed components A) and B) in admixture, separately from the fuel.

The Applicant has surprisingly and unexpectedly found that in the fumes coming out from the combustor, operated according to the invention process, the powder amount is drastically reduced and in particular the amount of the ash fraction having particle size lower than or equal to 2.5 μm, more specifically lower than 1 μm, still more specifically lower than 0.4 μm, is drastically reduced.

It has been unexpectedly and surprisingly found by the Applicant that in the process of the present invention, both the metals present in component A) and those present in the fuel remain under the liquid state in the combustor and are then removed, as said, from the bottom of the combustor. Furthermore the emission value stack for PM 2.5 according to EC 2000/76 standard is reduced to values lower than 50 micrograms/Nm$^3$.

Process control for particles having particle size diameters <2.5 micrometers is performed by using sensors located in the fumes at the outlet of the combustor. For example an opacimeter can be used. In particular an instrument ELPI (Electrical Low Pressure Impactor) can be used. This operates by continuously scanning the PUF (Ultra Fine Particulate), generally having 2.5-0.01 μm particle sizes, with a 10 minute frequency. This supplies the required information for the dosing of compound A) in the combustor in order to maintain the total PUF content well below the above concentrations, some orders of magnitude lower than what reported in the prior art, for example in BATs.

As said, it has been surprisingly and unexpectedly found by the Applicant that the invention process is particularly effective in retaining at the melted state in the combustor also those heavy metals which normally are present in the fumes in remarkable amounts in the form of thin powders. For example, in the prior art it is well known that cadmium, under the form of the CdO oxide, volatilizes in the prior art combustion processes and is totally found as ultrafine thin particulate in fumes and passes practically unaltered through the fume post-treatment plants. On the contrary, under the conditions used in the process of the present invention, cadmium oxide is almost completely removed from the fumes discharged into the atmosphere.

With the process of the present invention also other heavy metals, for example manganese, copper, chromium, vanadium, lead can be removed almost quantitatively.

Manganese and copper are found in the combustion conditions, respectively under the form of $Mn_2O_3$ and $CuO$, which are high-melting oxides. With the process of the present invention it is possible to maintain the total normalized concentration of these oxides in thin powders PM 2.5 under 10 μg/Nm$^3$, thus at a concentration well below the limits of the above mentioned standard and of the prior art, for example BAT.

Chromium is found in ashes under the form of chromite, or chromium III (trivalent chromium), which is toxic. Chromium is found also under the form of chromate and bichromate, or chromium VI (hexavalent chromium), which is highly toxic. It is known that in the presence of bases and acids, or under the form of alkaline chromite, by heating at relatively low temperatures (700 K) and for a time higher than one hour, chromium III is converted for the great part to chromium VI. The above mentioned temperature conditions and time periods are used, for example, in the gasification process of the prior art. It is also known that chromites in the presence of strong alkali can be transformed into chromium VI at temperatures above 1,450 K, also using in the combustor short residence times. Chromium VI is found in variable amounts in fly ash of all the combustion processes found in fossil fuels and in scraps.

It has been surprisingly found that with the process of the present invention, chromium is almost quantitatively retained in melted ashes. Chromium VI found in thin powders is lower than the sensitivity limit of the analytical method used (0.01 μg/Nm$^3$-NIOSH 7600). Therefore the invention process is effective in removing this metal from combustion fumes. This allows to use the process of the invention also for those fuels having a very high content of chromium. For example also tanning slurries, containing an amount of chromium III of the order of 40,000 ppm, can be used in the process of the present invention to produce energy. Tanning slurries contain chromium III in the form of basic chromites which are dangerous for human health. It has been found that by using the combustion process according to the present invention, the amount of chromium VI in thin powders of in the combustion fumes is lower than 0.1 µg/Nm$^3$.

Vanadium is present in crude oils, in particular it is present in high concentrations in heavy crudes, in bitumens, in shales and tar sands, as well as in scrap heavy fractions of oil processings. Vanadium is a toxic heavy metal. At the temperatures used in the combustion processes vanadium is under the form of $V_2O_5$ oxide which is a high-melting solid. At temperatures higher than 1,670 K $V_2O_5$ is transformed into the volatile $VO_2$. In addition $V_2O_5$ catalyzes the conversion of $SO_2$ to $SO_2$. This compound is a particularly aggressive gas, due to the formation of sulphuric acid, which is deposited on the walls of the plants downstream of the combustor, at the temperatures at which the thermal recovery plants are operated.

It has been surprisingly found that, with the process of the invention, by operating at combustion temperatures from 1,500 K up to <1,670 K, it is possible to significantly reduce the amount of vanadium in fumes. With the process of the present invention it is thus possible to use also low ranking fuels, which otherwise cannot be used with the prior art combustors except that in plants made of special materials, even though with remarkable inconveniences, as said above. Furthermore it is possible to combine a Joule-Bryton cycle with the combustor of the invention, for example pressurized at 1,000 kPa, followed by turboexpansion on net fume production, and a Rankine cycle on the heat recovered from hot gases, before recycling them to the combustor or to the mixer-cooler. In this way transformation yields from thermal energy into electric energy higher than 57% can be reached.

The following examples illustrate with non limitative purposes the present invention.

EXAMPLES

Example 1

Characterization of Powders

The particulate contained in combustion fumes is collected by an Andersen Mark III type impactor equipped with a pre-separator capable to remove the particles with aerodynamic diameter greater than 10 µm and to separate PM 10, by using a sampling flow of 14 liters/min, and filters for granulometric fractions with aerodynamic diameter in the range 10-9 µm; 9-5.8 µm; 5.8-4.7 µm; 4.7-3.3 µm; 3.3-2.1 µm; 2.1-1.1 µm; 1.1-0.7 µm; 0.7-0.4 µm.

At the end of the sampling procedure, the collected particulate fractions have been subjected to chemico-physical analysis by scanning electronic microscopy (SEM) and X-ray analysis.

The particle chemical analysis has been carried out with a SEM Philips XL30 microscope, equipped with a thin window EDX system for the microanalysis by energy dispersion spectrometry, by using an automatic system capable to automatically detect the particles when a predetermined threshold is exceeded.

The morphological parameters and the composition have been determined for each of the identified particles by measuring the intensities of the lines characteristic of the X-ray spectrum, then converted into the corresponding atomic concentrations. The particulate with sizes smaller than 0.4 µm, that escape from the last stage of the Andersen impactor, has been collected on mica supports for the analysis by atomic force microscope by a pneumatic actuator capable to collect, by thermophoretic effect, a sufficient and statistically significant number of particles. The gaseous current coming out from the impactor is then sent to a condensation system of the combustion steamer. The condensed phase has then been subjected to spectroscopic analysis for determining the concentration of the nanometric particulate <0.4 µm.

The analysis for metals is carried out by plasma-induced spectroscopy by using the ICP-OES instrument by Thermo Electron Corporation.

Sulphur or sulphate is determined by chemical analysis.

The ashes in fuels are determined according to the ISO 1171 test.

The ash melting temperature is determined according to the ASTM D 1857-87 test.

The low-melting fraction of the fuel ashes is determined by using a melting pot with a 5 mm diameter hole at the bottom, by heating an ash sample in the pot at 1,450 K and maintaining this temperature for at least 2 hours. The weight of the melted fraction which flows from the bottom of the melting pot is determined. The metals therein contained are determined with the method reported above.

Moisture is determined according to conventional analytical procedure, for instance by using a Karl Fischer instrument.

Example 2

An isothermal and flameless 5 MW combustor is operated at 1,750 K and 400 kPa.

The comburent is formed of oxygen having a titre of 92% by vol. and is fed in excess on the stoichiometric amount.

The fed fuel, at a rate of 7.3 l/min, is commercial heavy oil having the following analytical characteristics (% by weight):

| | |
|---|---|
| content of asphaltenes and carbonaceous material | 16% |
| sulphur | 0.9% |
| ashes | 0.2% |

The ashes do not contain any fraction melting at a temperature ≤1,450 K. The amount of total metals in the oil, determined by ICP-OES is equal to 0.08% by weight.

The great part of the metal amount is calcium (0.014% by weight on the oil). Aluminum and silicon have been also found.

A 6% w/w aqueous solution of potassium sulphate (melting temperature 1340 K) is fed separately to the combustor at a rate of 0.1 l/min.

On the basis of the optical ICP analysis of metals carried out both on the fuel and on potassium sulphate it is found that the molar ratio $A'/(A''-A')$ is 0.3.

It is also found that the molar ratio $B^I/C^I$ is about 10.

The analysis carried out with the Andersen impactor has given the following results:

absence (i.e. below the analytical method sensitivity limit) of thin powders having an organic origin (cenospheres and plerospheres, containing carbon, hydrogen and oxygen), called also soot.

inorganic powders in an amount lower than 1 mg/Nm$^3$ (normalized value).

After fume filtration, PM 2.5 is 3 µg/Nm$^3$ (normalized value).

The metals present the flue powders are mainly potassium and calcium and, as minor components, aluminum, iron and zinc.

The walls of the combustor and of the thermal recovery plants have been inspected at the end of the process. No corrosion is noticed.

Example 3 (Comparative)

A thermal non-flameless 6 MW combustor of the prior art using preheated air (1,300 K, atmospheric pressure) is fed with the heavy oil of Example 2, at a rate of 7.3 l/min, but without feeding of the aqueous solution of potassium sulphate.

Oxygen is fed as in example 2.

Analysis of the powders in combustion fumes has been carried out after filtering the fumes on a sleeve filter. It is found that the filtered fumes contain a great amount of organic particles (cenospheres and plerospheres).

Besides, it is found and that PM 10 (comprising both organic and inorganic particles) are 6 mg/Nm$^3$ and that PM 2.5 is 4 mg/Nm$^3$. Therefore PM 2.5 forms the great part of PM 10.

By comparing the results obtained in example 2 with those of example 3 comparative, it is found that PM 2.5 in the fumes from the combustion process of the invention are of about 3 orders of magnitude lower than those of the combustor of example 3 comparative.

Example 4

An isothermal and flameless 5 MW combustor is operated at 1,650 K and 500 kPa.

The comburent is oxygen having a titre of 92% by vol. and is fed in excess on the stoichiometric amount.

In order to investigate the performance of the process of the present invention when the feedings contain high amounts of a toxic metal such as chromium, an aqueous slurry is prepared by precipitating an aqueous solution of commercial tanning salt (under the form of chromite) with commercial lime Ca(OH)$_2$.

The analysis of the solids contained in the slurry (% weight) has given the following results:

| | |
|---|---|
| CaSO$_4$ | 70% |
| Cr(OH)$_3$ | 26% |

The difference to 100% being other metals, mainly sodium and zinc, according to ICP-OES analysis.

The titre of the aqueous slurry is adjusted with water to 45% by weight of solids.

Sulphur (25 g/liter of slurry) and a nonionic surfactant (polyethoxylate) (3 g/liter of slurry) are then added to the slurry.

To the combustor light oil (diesel oil) at a rate of 5 l/min is fed.

The slurry is fed separately from the diesel oil at a rate of 0.5 l/min, corresponding to a feeding rate of Cr (III) of about 2 kg/h.

To the combustor are also fed 0.3 l/h of an aqueous solution 9% by weight of potassium sulphate (melting temperature 1,340 K) containing in suspension 25% by weight of commercial bentonite (Al$_2$O$_3$.4SiO$_2$, melting temperature 1,590 K), and 4% by weight of potassium pyrophosphate (melting temperature 1,363 K).

On the basis of ICP-OES analysis carried out on the slurry, oil, bentonite, potassium sulphate and potassium pyrophosphate, it has been found that the molar ratio $A'/(A''-A')$ is 0.13.

It is also found that the molar ratio $B^I/C^I$ is 1.1.

Analyses are carried out on the combustion fumes sampled at the combustor outlet.

The amount of total inorganic powders in the fumes is of about 4 mg/Nm$^3$. Metal analysis carried out on said powders shows that the following metals: Na, Ca, K, S, Fe are the main components.

It has been found in particular, the quantity of chromium III is lower than 0.1 mg/Nm$^3$. Chromium VI is instead absent (NIOSH method).

In the fumes emitted into the air PM 2.5 (normalized value) is 19 µg/Nm$^3$. Chromium III is lower than 1 µg/Nm$^3$ and chromium VI is absent.

The walls of the combustor and of the thermal recovery plants are inspected at the end of the process. No corrosion is found.

The vitrified slags discharged from the settlers are subjected to a leaching test of organics and heavy metals. The slags are within the limits for the classification as inerts. See UNI EN 12457 standard, parts from 1 to 4.

Analysis of said slags shows that they contain chromium in an amount corresponding to that fed with the aqueous slurry CasO$_4$/Cr (OH)$_3$.

Example 5 (Comparative)

The combustor is operated under the conditions of example 4, except that no feeding of sulphur and of the solution of potassium sulphate containing in suspension bentonite and pyrophosphate, is carried out.

The powders in fumes at the combustor outlet are in an amount higher than 1 g/Nm$^3$. Metal analysis of said powders shows that they contain substantial amounts of chromium III.

The walls of the separatory cyclone that has been positioned at the combustor outlet, upstream of the Andersen impactor, are visually inspected. It is found that a thick, yellow-green dusty layer covers said walls. By a colorimetric test (EPA 7196) it is found that the layer contains a significant amount of chromium VI.

By comparing the results obtained in example 4 with those of example 5 comparative, it results that at the combustor outlet in the process of the invention the chromium III amount is very low and chromium VI is absent, whereas in the process of example 5 comparative both chromium III and chromium VI are present, the former in remarkable amounts.

Example 6

In an isothermal and flameless 5 MW combustor, as fuel an olive husk containing basic ashes, under the form of slurry in water, at 62% by weight of water on the dry product, is fed. The comburent is oxygen having a titre of 92% by vol. and is fed to the combustor in an amount in excess with respect to the stoichiometric value, so to have an oxygen concentration in the fumes coming out from the combustor comprised between 1% and 3% by volume.

The olive husk has a content of sulfur, total ashes and humidity as it follows (% by weight):

| | |
|---|---|
| sulphur | 0.1 |
| total ashes (residue at 600° C.) | 7 |
| humidity | 9 |

By ICP-OES analysis the metals present in the ashes are determined. It is found that the most abundant metals are, as % by w., Ca 13.0%, and K 18.0%.

Said ashes show a melting point lower than 1,450 K.

The olive husk slurry is prepared by admixing the solid in a tank, under agitation, with water, so to obtain an amount of water of 62% by weight calculated on the dry product. Load batches of 3 m$^3$ are prepared each time.

To said slurry sulfur in powder form and sodium alkylarylsulphonate surfactant are added, under stirring, so to have the following concentrations:
sulfur: 9 kg/3 m$^3$ slurry
surfactant: 60 g/3 m$^3$ slurry.

The olive husk aqueous slurry is fed to the combustor at a rate of 1,200 Kg/h, calculated on the dry olive husk.

It is found that the molar ratio $B^I/C^I$ is 0.9.

The combustor is operated for a total of 120 hours.

The combustion fumes at the combustor outlet contain $SO_2$ at the concentration of 600 ppv and hydrochloric acid at the concentration of 65 ppv.

Analyses on the fumes emitted into the air has shown the absence of organic powders. PM 2.5 is 25 µg/Nm$^3$.

Every 8 hours about 700 kg of wet vitrified slags are discharged from the settlers.

The vitrified slags are subjected to a leaching test for organic compounds and heavy metal determination. The slags are within the limits for the classification as inerts. See UNI EN 12457 standard, parts from 1 to 4.

The walls of the combustor and of the thermal recovery plants are inspected at the end of the process. No corrosion is noticed.

The invention claimed is:

1. A combustion process comprising the step of adding to a combustor a comburent, a fuel, component B) and component A) wherein:
    component B) comprises sulphur or sulphur-containing compounds, wherein the sulphur or sulphur-containing compounds are present in an amount to have a molar ratio $B^I/C^I \geq 0.5$, wherein
    $B^I$ is the sum by moles between the total amount of sulphur present in component B)+the total amount of sulphur contained in the fuel,
    $C^I$ is the sum by moles between the total amount of alkaline and/or alkaline-earth metals contained in the fuel+the amount of alkaline and/or alkaline-earth metals in the form of salts and/or oxides contained in component B),
    component A) comprises low-melting salts and/or oxides, the low-melting salts and/or oxides having a melting temperature ≤1,450 K, wherein the ratio by moles A'/(A"−A') is ≥0.01,
being
    A' the sum by moles between the metals under the form of low melting salts and/or oxides in the component A) and the amount of metals of low-melting salts and/or oxides contained in the fuel,
    A" the sum of the amount of all the metals contained in the fuel and of those contained in component A),
in which
    the combustor is isothermal and flameless,
    wherein the comburent is oxygen and is used in excess with respect to the fuel.

2. A process according to claim 1, wherein in the combustor the pressure is comprised between values higher than or equal to 101.3 kPa and up to about 2,000 kPa and the temperature is comprised between 1,500 K and up to 2,100 K.

3. A process according to claim 1, wherein the combustion gases at the combustor outlet are cooled at a temperature equal to or lower than 1,100 K.

4. A process according to claim 1, wherein the fuel residence times in the combustor range from 0.5 seconds up to 30 minutes.

5. A process according to claim 1, wherein the comburent is premixed with recycling fumes, the fume amount is higher than 10% by volume.

6. A process according to claim 1, wherein the recycling fumes contain water in vapour form, in amounts, calculated on the total volume of the recycling fumes, greater than 10% by volume.

7. A process according to claim 6, wherein the feeding fuel contains or is added with water in an amount, expressed as percent by weight, up to 80%.

8. A process according to claim 1, wherein the molar ratio $B^I/C^I$ is at least 0.7.

9. A process according to claim 1, wherein the addition of component B) to the combustor is carried out by feeding component B) separately from the fuel or in admixture therewith.

10. A process according to claim 1, wherein, when component B) is sulphur, is fed as an aqueous dispersion containing surfactants.

11. A process according to claim 1, wherein the fed amount of component B) is such that in the combustion fumes the partial pressure of $SO_2$ is higher than 40 Pa.

12. A process according to claim 1, wherein the ratio by weight A'/(A"−A') is at least 0.1 up to 1,000,000.

13. A process according to claim 1, wherein the addition of component A) to the combustor is carried out by feeding component A) separately from the fuel or in admixture with it.

14. A process according to claim 13, wherein the component A) is fed separately from the fuel under the form of an aqueous solution or suspension.

15. A process according to claim 1, wherein to the combustor the components A) and B) are added in admixture, separately from the fuel.

16. Fumes obtainable according to the process of claim 1, wherein PM 2.5 is lower than 50 microgram/Nm$^3$ and the partial pressure of $SO_2$ is higher than 40 Pa.

* * * * *